UNITED STATES PATENT OFFICE.

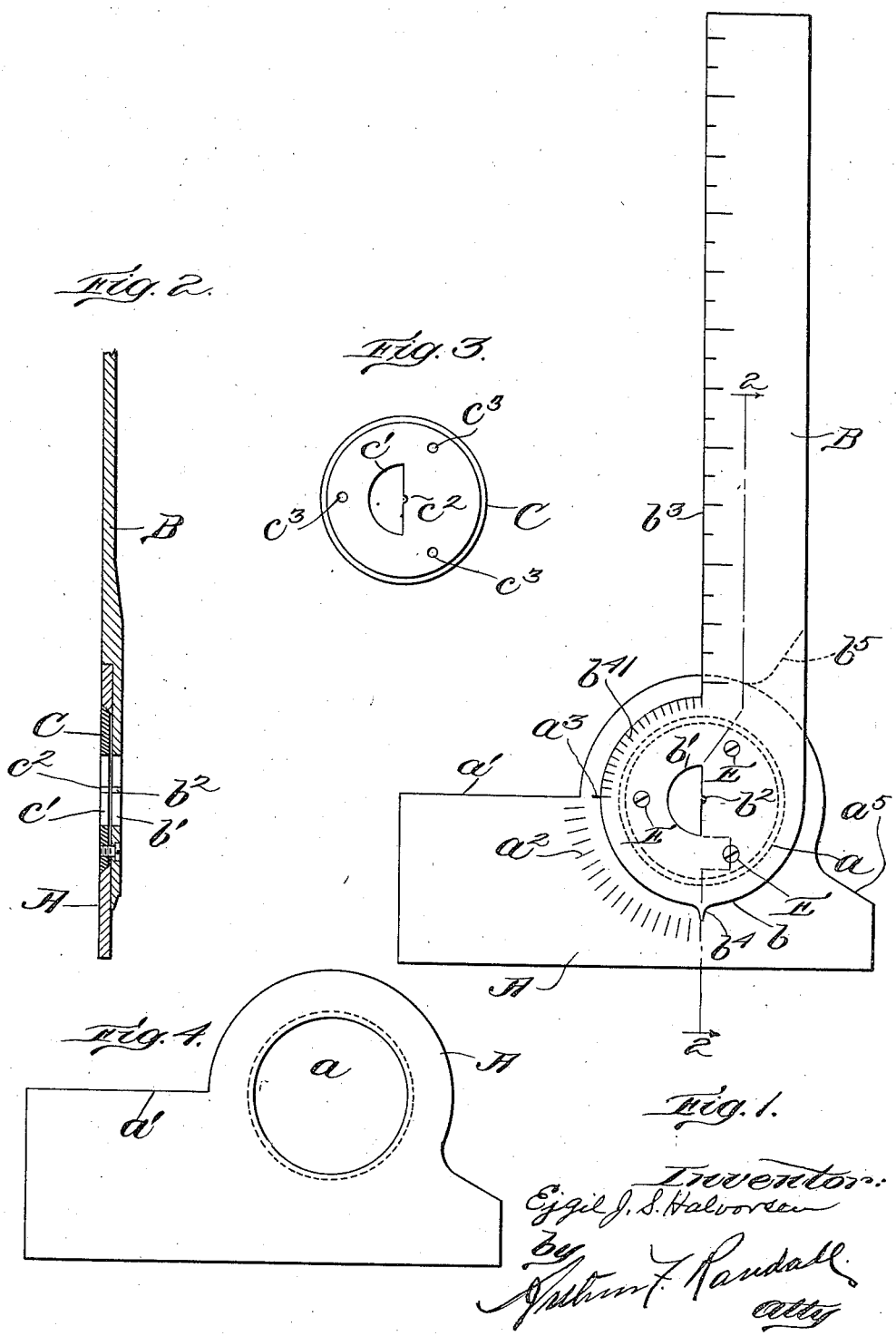

EJGIL J. S. HALVORSEN, OF WOBURN, MASSACHUSETTS.

PROTRACTOR.

1,172,281.

Specification of Letters Patent.

Patented Feb. 22, 1916.

Application filed July 9, 1915. Serial No. 38,974.

*To all whom it may concern:*

Be it known that I, EJGIL J. S. HALVORSEN, a citizen of the United States, residing at Woburn, in the county of Middlesex and State of Massachusetts, have invented certain new and useful Improvements in Protractors, of which the following is a specification.

My invention relates to improvements in protractors such as are used by engineers, draftsmen and the like, and it has for its object to provide an improved instrument of this kind.

The invention consists of a protractor embodying the peculiar features of construction and mode of operation set forth in the following description and particularly pointed out and defined in the claims at the close thereof.

In the accompanying drawings: Figure 1 is an elevation of a protractor constructed in accordance with my invention. Fig. 2 is a section on line 2—2 of Fig. 1. Fig. 3 is a view of the pivot disk hereinafter described. Fig. 4 is a view of the base member hereinafter described.

My improved protractor, as herein shown, comprises two members A and B pivotally connected together by means of a disk C and three screws E. The member A is made with a tapered hole $a$ within which the disk C is arranged said disk being correspondingly tapered to fit said hole. The larger end of the tapered hole is upon the underside of the member A and its diameter is about the same as the largest diameter of the conical disk C so that the tapered side of the latter is flush, or substantially flush with the underside of the member A.

The member B is made with a hub $b$ that is larger than the tapered hole or socket $a$ so that it bears upon the top side of the member A. The conical disk C has tapped holes $c^3$ which receive the threaded ends of the screws E and is made slightly thinner than the member A so that when the screws E are set up tight the conical disk C will be under more or less tension so that it not only snugly fits its tapered socket $a$ but also acts as a friction clutch to hold the two members A and B yieldingly yet securely in adjusted positions.

The member B is made with a sight hole $b'$ registering with a sight hole $c'$ formed in the disk C. Each of these sight holes is semicircular in form and its straight side intersects the center of the socket hole $a$, the straight sides of the sight holes $b'$ and $c'$ are formed, respectively, with notches $b^2$ and $c^2$ coincident with the center or axis of the pivot disk C so that the protractor may be positioned with its axis coincident with a common center from which an angle is being plotted. The member A is made with a straight edge $a'$ in alinement with the axis of pivot disk C while the member B is made with a straight edge $b^3$ also in alinement with the axis of pivot disk C.

As will be clear the two members A and B can be angularly adjusted relatively by swinging on the axis of the pivotal connection provided by disk C and screws E, and in order that their relative movements may be measured I provide a scale $b^{41}$ on the hub of member B coöperating with an index $a^3$ on member A and a scale $a^2$ on member A coöperating with an index or pointer $b^4$ on member B. The under side of member B is flush with the under side of member A and the arrangement of the two straight edges $a'$ and $b^3$ is such that the two members can be swung close together with said straight edges parallel and resting one against the other. From this position the two members can be opened to the extent of 180° the opening movement of the two members being limited by the engagement of a shoulder $b^5$ on member B with a shoulder $a^5$ on member A. Of course it will be clear to those skilled in this art that a greater or less range of relative movement between the two members may be secured by varying the angular position of the stop shoulder $a^5$. Start with the two straight edges $a'$ and $b^3$ parallel and side by side the first 90° relative movement of the two members is measured by the scale $b^{41}$ while the last 90° of movement is measured by the scale $a^2$. When the pivotal connection provided by the disk C and screws E becomes loose through wear of the bearing surfaces this looseness may be taken up by tightening the screws E.

The chief advantage to the construction above described is its simplicity, durability and great range of adjustment of the two members A and B. Also it will be observed that not only does the peculiar pivotal connection afford a means for frictionally holding the two members in adjusted position but wear upon this pivotal connection and adjustment of the screws E to take up said wear does not disturb the relation of the straight edges $b^3$ and $a'$ to each other or to the axis of the pivotal connection.

Many protractors, as heretofore constructed, have included projecting screws, nuts and other parts which permitted only one side of the instrument to be laid onto a drawing board or a sheet of paper and which were otherwise in the way. My improved protractor has no such projections on it and it may be laid either side down upon a sheet of paper or drawing board. With this in view I propose, in some cases to make the two blades or members A and B and the pivot disk C from transparent material so that the markings on the instrument may be seen from either side thereof.

Another objection to protractors as heretofore constructed has been that the pivotal joint connecting the two members would in time wear loose and there was no provision made for taking up this wear which resulted in inaccuracy of the instrument. As stated above any looseness at the pivotal joint of my improved protractor occasioned through wear may be quickly taken up by adjusting the countersunk screws E and in this connection it is to be observed that it is not essential to my invention that the pivot disk C be thinner than the member A since even if the disk C is made as thick as the member A the adjustment necessary to take up looseness of the joint occasioned by wear may be made by removing the disk C and reducing its thickness slightly by sandpapering the smaller end of said disk.

What I claim is:

1. A protractor comprising a base member formed with a circular hole therethrough and with a straight edge alined with the center of said hole; a movable member extending across said hole at one side of the base member; a retaining and centering member for the movable member formed with an annular beveled edge fitted into said hole at the opposite side of said base member, and means securing said retaining and centering member to said movable member.

2. A protractor comprising a base member formed with a circular hole therethrough and with a straight edge alined with the center of said hole; a movable member extending across said hole at one side of the base member and made with a straight edge alined with the center of said hole; a disk formed with a beveled edge fitted into said hole at the opposite side of said base member; means securing said disk to said movable member; markings upon one of said members indicating degrees and an index on the other member coöperating with said markings.

3. A protractor comprising a base member formed with a circular hole therethrough and with a straight edge alined with the center of said hole; a movable member extending across said hole at one side of the base member and made with a straight edge alined with the center of said hole; a disk formed with a beveled edge fitted into said hole at the opposite side of said base member; means securing said disk and movable member together so as to clamp the base member between them; markings upon one of said members indicating angular degrees; an index on the other member coöperating with said markings, said base member and said movable member each being made with a sight hole having a straight edge alined with the center of said hole and marked to indicate said center.

4. A protractor comprising two relatively movable members, one of said members being formed with a circular hole therethrough and with a straight edge alined with the center of said hole and the other member extending across said hole at one side of the first mentioned member and made with a straight edge alined with the center of said hole; a disk having a beveled periphery fitted into said hole at the opposite side of said first mentioned member; means securing said disk and the second member together so as to frictionally hold the first mentioned member between them; markings upon one of said members indicating degrees; an index on the other member coöperating with said markings, and means to indicate the location of the center of said hole.

EJGIL J. S. HALVORSEN.

Witness:
EDWARD N. CARPENTER.

Copies of this patent may be obtained for five cents each, by addressing the "Commissioner of Patents, Washington, D. C."